US011157380B2

(12) United States Patent
Sethi et al.

(10) Patent No.: US 11,157,380 B2
(45) Date of Patent: Oct. 26, 2021

(54) DEVICE TEMPERATURE IMPACT MANAGEMENT USING MACHINE LEARNING TECHNIQUES

(71) Applicant: Dell Products L.P., Round Rock, TX (US)

(72) Inventors: Parminder Singh Sethi, Punjab (IN); Hung T. Dinh, Austin, TX (US); Sabu K. Syed, Austin, TX (US); Kannappan Ramu, Frisco, TX (US)

(73) Assignee: Dell Products L.P., Round Rock, TX (US)

(*) Notice: Subject to any disclaimer, the term of this patent is extended or adjusted under 35 U.S.C. 154(b) by 169 days.

(21) Appl. No.: 16/665,241

(22) Filed: Oct. 28, 2019

(65) Prior Publication Data
US 2021/0124663 A1 Apr. 29, 2021

(51) Int. Cl.
G06F 11/30 (2006.01)
G06F 11/32 (2006.01)
G06F 17/18 (2006.01)
G06N 3/02 (2006.01)
G06N 20/00 (2019.01)

(52) U.S. Cl.
CPC ........ G06F 11/3058 (2013.01); G06F 11/327 (2013.01); G06F 17/18 (2013.01); G06N 3/02 (2013.01); G06N 20/00 (2019.01)

(58) Field of Classification Search
CPC .... G06F 11/3058; G06F 11/327; G06F 17/18; G06F 1/206; G06N 3/02; G06N 20/00; G06N 20/10; G06N 20/20
See application file for complete search history.

(56) References Cited

U.S. PATENT DOCUMENTS

| 7,644,051 | B1 | 1/2010 | Moore et al. |
| 10,747,281 | B1* | 8/2020 | Trim ..................... H04N 7/181 |
| 10,839,260 | B1* | 11/2020 | Khanna .................. G06K 9/209 |
| 2015/0164349 | A1* | 6/2015 | Gopalakrishnan .......................... A61B 5/02416 600/508 |
| 2017/0115675 | A1* | 4/2017 | Demetriou ......... G05D 23/1904 |
| 2018/0174658 | A1 | 6/2018 | Kikuchi |
| 2019/0075687 | A1 | 3/2019 | Brundstetter et al. |

* cited by examiner

Primary Examiner — Manuel L Barbee
(74) Attorney, Agent, or Firm — Ryan, Mason & Lewis, LLP

(57) ABSTRACT

Methods, apparatus, and processor-readable storage media for device temperature impact management using machine learning techniques are provided herein. An example computer-implemented method includes obtaining one or more notifications pertaining to temperature information associated with one or more devices; generating one or more predictions pertaining to at least one potential problem with at least one of the one or more devices by applying one or more machine learning models to the one or more obtained notifications; determining one or more automated actions related to the one or more predictions by utilizing at least one neural network to process data associated with temperature control for the at least one device; and automatically initiating the one or more automated actions.

20 Claims, 7 Drawing Sheets

```
import numpy as np
import pandas as pd
import os
import matplotlib.pyplot as plt
import seaborn as sns
import timeit
import warnings
import itertools
import seaborn as sns
from numpy.random import seed
from numpy.random import randn
from matplotlib import pyplot
from statsmodels.graphics.gofplots import qqplot
from sklearn import preprocessing
from sklearn.model_selection import train_test_split
from sklearn.tree import DecisionTreeClassifier
from sklearn.metrics import classification_report,confusion_matrix,accuracy_score warnings.filterwarnings("ignore")
plt.style.use('fivethirtyeight')
import matplotlib
matplotlib.rcParams['axes.labelsize'] = 14
matplotlib.rcParams['xtick.labelsize'] = 12
matplotlib.rcParams['ytick.labelsize'] = 12
matplotlib.rcParams['text.color'] = 'k' data = pd.read_csv()
data.head(10)
X = data.drop('Current_Temperature',axis=1)
y = data['Current_Temperature']
# splitting the data into train and test
X_train, X_test, y_train, y_test=train_test_split(X,y,test_size=0.30, random_state=99)
X_train.head()
# Fitting the Decision tree with default hyperparameters , aprt from
#max_depth which is 5 so that we can plot and read the tree
temp_default = DecisionTreeClassifier(max_depth=5, criterion = 'entropy')
temp_default.fit(X_train, y_train)
y_pred_default = temp_default.predict(X_test)
print(y_pred_default)

print(classification_report(y_test, y_pred_default))
```

FIG. 4

DEVICE TEMPERATURE IMPACT MANAGEMENT USING MACHINE LEARNING TECHNIQUES

FIELD

The field relates generally to information processing systems, and more particularly to techniques for processing data pertaining to device environments in such systems.

BACKGROUND

In many contexts (such as, for example, data center contexts), higher ambient temperatures can negatively affect the reliability, performance and lifetime of devices. However, conventional device management approaches typically generate alerts and/or warnings in response to problems that are insufficiently clear and/or reactive in nature (and therefore preclude the possibility of preventative action).

SUMMARY

Illustrative embodiments of the disclosure provide techniques for device temperature impact management using machine learning techniques. An exemplary computer-implemented method includes obtaining one or more notifications pertaining to temperature information associated with one or more devices, and generating one or more predictions pertaining to at least one potential problem with at least one of the one or more devices by applying one or more machine learning models to the one or more obtained notifications. Such a method also includes determining one or more automated actions related to the one or more predictions by utilizing at least one neural network to process data associated with temperature control for the at least one device, and automatically initiating the one or more automated actions.

Illustrative embodiments can provide significant advantages relative to conventional device management approaches. For example, challenges associated with unclear and/or reactive warnings are overcome in one or more embodiments through the automatic generation of specific temperature-related predictions of potential device problems via the application of machine learning models and other machine learning techniques to relevant temperature-related device information.

These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for implementing a decision tree machine learning model with density distribution for predicting errors in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
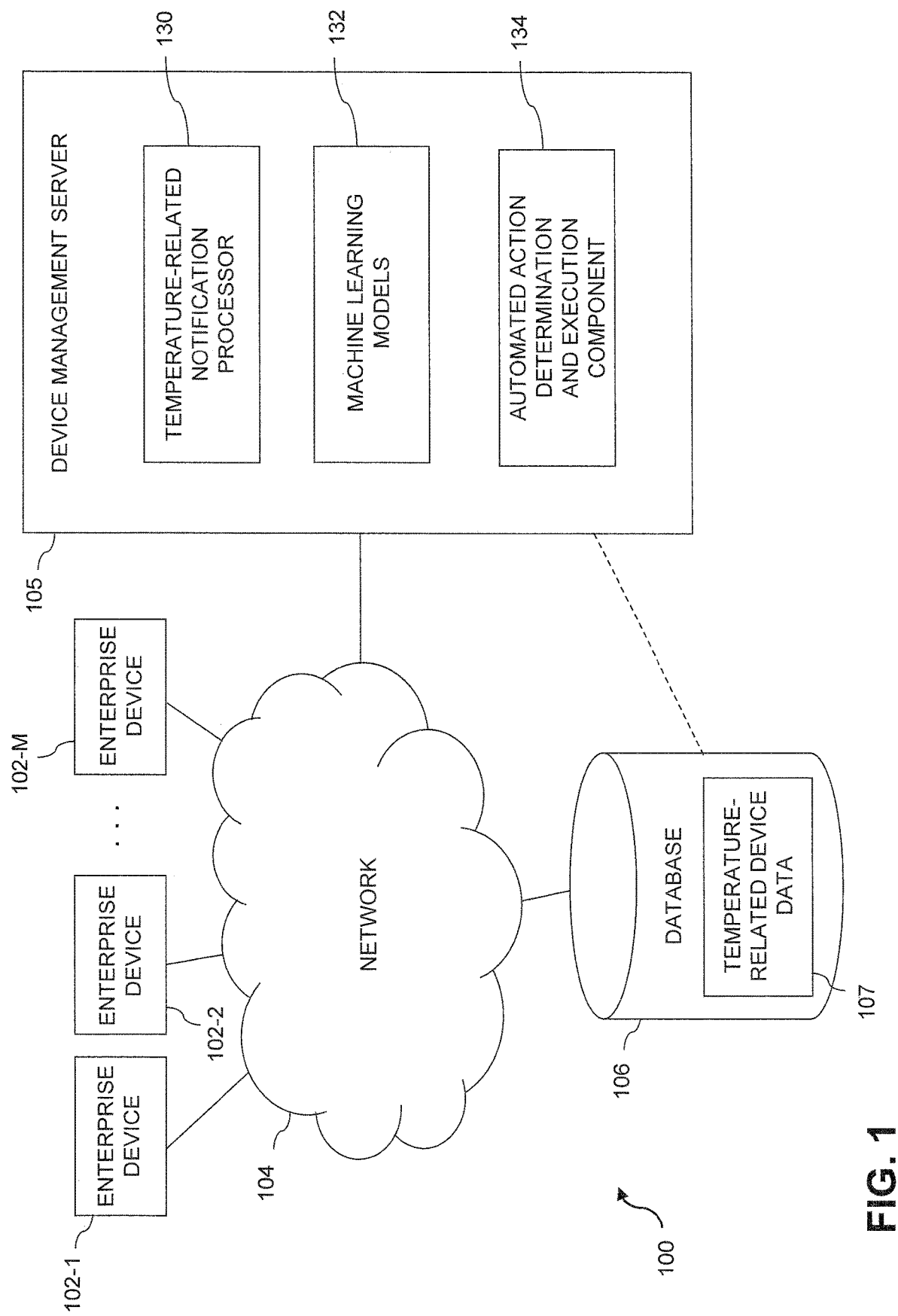
FIG. 1 shows an information processing system configured for device temperature impact management using machine learning techniques in an illustrative embodiment.

FIG. 1 shows a computer network (also referred to herein as an information processing system such as, for example, a data center) 100 configured in accordance with an illustrative embodiment. The computer network 100 comprises a plurality of enterprise devices 102-1, 102-2, . . . 102-M, collectively referred to herein as enterprise devices 102. The enterprise devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device management server 105.

The enterprise devices 102 may comprise, for example, laptop computers, tablet computers, desktop computers, mobile telephones or other types of computing devices. Such devices are examples of what are more generally referred to herein as "processing devices." Some of these processing devices are also generally referred to herein as "computers."

The enterprise devices 102 in some embodiments comprise respective computers associated with a particular company, organization or other enterprise of associated users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device management server 105 can have an associated database 106 configured to store data 107 pertaining to temperature-related device information, which comprise, for example, temperature and temporal values in relation to one or more types of alerts, notifications, device component failures, etc.

The database 106 in the example embodiment depicted in FIG. 1 is implemented using one or more storage systems associated with the device management server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

In one or more embodiments, also associated with the device management server 105 are input-output devices, which illustratively comprise keyboards, displays or other types of input-output devices in any combination. Such input-output devices can be used, for example, to support one or more user interfaces to the device management server 105, as well as to support communication between the device management server 105 and other related systems and devices not explicitly shown.

Additionally, in at least one embodiment, the device management server 105 can be implemented using at least one processing device. Each such processing device generally comprises at least one processor and an associated memory, and implements one or more functional modules for controlling certain features of the device management server 105, as further detailed herein.

More particularly, the device management server 105 in such an embodiment can comprise a processor coupled to a memory and a network interface.

The processor illustratively comprises a microprocessor, a microcontroller, an application-specific integrated circuit (ASIC), a field-programmable gate array (FPGA) or one or more other types of processing circuitry, as well as portions and/or combinations of such example circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or one or more other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the device management server 105 to communicate over the network 104 with the enterprise devices 102, and illustratively comprises one or more conventional transceivers.

The device management server 105, as depicted in FIG. 1, further comprises a temperature-related notification processor 130, machine learning models 132, and an automated action determination and execution component 134.

It is to be appreciated that this particular arrangement of modules 130, 132 and 134 illustrated in the device management server 105 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the temperature-related notification processor 130, machine learning models 132, and automated action determination and execution component 134 may be implemented at least in part in the form of software that is stored in memory and executed by a processor.

It is to be understood that the particular set of elements shown in FIG. 1 for device temperature impact management using machine learning techniques involving enterprise devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing temperature-related notification processor 130, machine learning models 132, and automated action determination and execution component 134 of an example device management server 105 in computer network 100 will be described in more detail with reference to the flow diagram of FIG. 5.

Accordingly, at least one embodiment of the invention includes proactively using machine learning techniques to identify one or more potential device failures pertaining to errors due to temperature variation associated with data center devices and/or components thereof. Such an embodiment can include preventing unexpected and/or costly downtime and damages to the data center network infrastructure.

One or more embodiments include utilizing error alerts based on time. By way of illustration, consider an example wherein a pattern is exhibited across different devices within a data center, wherein such a pattern includes a spike in the number of alerts on specific days (e.g., alerts related to temperature values associated with one or more device components that may be problematic), followed by a plateau of significantly fewer alerts in the subsequent days. At least one embodiment includes creating an analysis report of device behavior related to such a pattern, and using one or more machine learning models to predict which of the alerts are likely become a potential problem for one or more of the corresponding devices (or components thereof). Such an embodiment further includes utilizing at least one artificial intelligence framework (such as a neural network, for example) to initiate one or more automated actions (e.g., remedial actions) based on the machine learning-based predictions.

Figure 2:
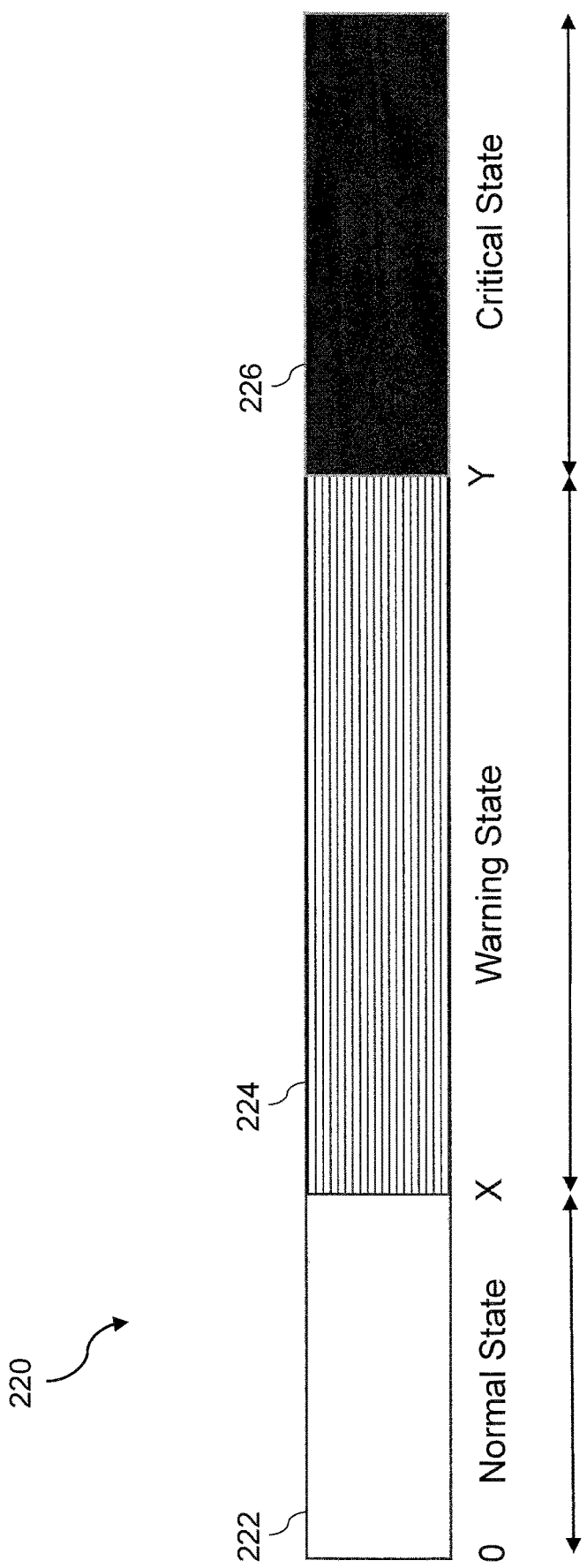
FIG. 2 shows an example temperature scale in an illustrative embodiment.

FIG. 2 shows an example temperature scale in an illustrative embodiment. By way of illustration, FIG. 2 depicts a temperature scale 220 that includes three sections: a first (unshaded) section 222 (encompassing temperature values ranging from 0 to X) designating a "Normal State," a second (horizontally-striped) section 224 (encompassing temperature values ranging from X to Y) designating a "Warning State," and a third (shaded) section 226 (encompassing temperature values beginning at Y and extending beyond Y) designating a "Critical State." As used herein, a "Normal State" refers to a non-problematic operational state with respect to one or more devices and/or components thereof. Additionally, a "Warning State" refers to a state proximate to and/or nearing a problematic operational state with respect to one or more devices and/or components thereof. Further, a "Critical State" refers to a problematic operational state with respect to one or more devices and/or components thereof.

By way merely of illustration, consider an example wherein an alert is generated on Day—1 as the temperature value associated with a given device surpassed the value X (but has not reached the value Y). As per the example temperature scale 220, such a temperature value is associated with a controlled and/or non-problematic operational state (i.e., "Warning State" 224), and as such, the alert will be considered as informative.

Continuing with the above example, assume that this situation (that is, the alert indicating that the temperature value associated with a given device surpassed the value X but has not reached the value Y) is repeating every $3^{rd}$ or $4^{th}$ day. Such a pattern, while not indicative of a critical issue with respect to the given device, might be indicative of the creation of some critical issues (e.g., crossing the Y temperature value) for some particular components of the given device and/or other devices (components such as, for example, a battery, motherboard, hard drive, monitor, graphics card, etc.

Accordingly, and as further detailed herein, at least one embodiment of the invention includes collecting the alerts (also referred to herein as notifications) pertaining to temperature information associated with given device, and generating one or more predictions by applying one or more machine learning models to the collected alerts. Such predictions include predictions pertaining to one or more components of the given device entering a "Critical State" based on the obtained temperature information and the application of the machine learning models.

Such an embodiment additionally includes identifying and/or determining one or more automated actions to be performed (for example, by the server and/or by the given device) in response to the one or more predictions. Such automated actions are identified and/or determined, for example, by utilizing a neural network to process data associated with temperature control for the given device (e.g., data related to controlling one or more fans associated with the given device).

Figure 3:
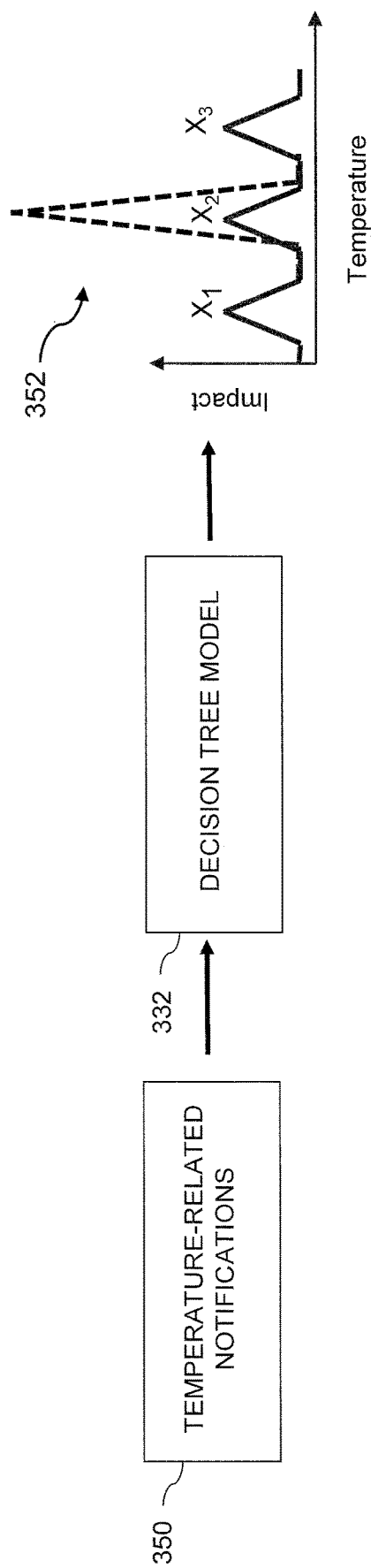
FIG. 3 shows an example decision tree error prediction workflow in an illustrative embodiment.

FIG. 3 shows an example decision tree error prediction workflow in an illustrative embodiment. By way of illustration, FIG. 3 depicts temperature-related notifications 350 being obtained by and/or provided as input to a decision tree model 332, which then generates an output 352 representing one or more potential problems related to at least one given device and/or one or more components thereof. Additionally, such an embodiment can also include filtering warning alerts from the temperature-related notifications 350 prior to submission to the decision tree model 332.

Application of the decision tree model 332 can include passing the filtered warning alerts to the end of a leaf node. Additionally, in determining one or more predictions based on temperature effects related to the warning alerts, one or more decision nodes of the decision tree model 332 decide and/or predict which of the warning alerts are likely to lead to a return to a normal and/or non-problematic operational state, and which of the warning alerts are likely to lead to a potential threat and/or critical state situation. Such decisions and/or predictions can be depicted via an output such as output 352 detailed in FIG. 3. Additionally, such decisions are carried out via applying one or more machine learning models to the warning alerts, wherein such machine learning models are trained using historical temperature-related device data including temperature values, temporal values, and operational state data pertaining to various devices across one or more data centers. Also, in one or more embodiments, the one or more machine learning models encompassed within decision tree model 332 are updated in accordance with each decision instance carried out and/or generated by the decision nodes.

Further, in response to the predictions of which of the warning alerts are likely to lead to a potential threat and/or critical state situation, one or more embodiments includes determining and/or identifying at least one appropriate and/or relevant automated action to be carried out (for example, by the server and/or by the given device). In at least one embodiment, the automated action can include a remedial and/or healing action aimed at modifying one or more relevant temperature values associated with the given device and/or components thereof. By way merely of example, such actions can include activation and/or manipulation of one or more fans and/or one or more heating and cooling components associated with the given device.

Accordingly, at least one embodiment includes using decision tree error prediction and density distribution machine learning techniques to proactively identify potential critical alerts related to a given device and/or components thereof based on collected informative warning alerts pertaining to the given device. Such density distribution machine learning techniques can include, for example, one or more data clustering techniques, one or more kernel density estimation techniques, implementation of one or more histograms, etc.

FIG. 4 shows example pseudocode for implementing a decision tree machine learning model with density distribution for predicting errors in an illustrative embodiment. In such an embodiment, pseudocode 400 is executed by or under the control of a processing device, such as device management server 105, or another type of processing device. For example, the pseudocode 400 may be viewed as comprising a portion of a software implementation of at least part of machine learning models 132 of the FIG. 1 embodiment.

The pseudocode 400 illustrates example steps for implementing a decision tree machine learning model with density distribution for predicting errors. Specifically, a first step includes setting and/or configuring an environment for a particular programming language framework. A second step includes installing and/or importing one or more necessary libraries for the given model. A third step includes reading and preprocessing sample datasets. Such a step can, more specifically, include normalizing the datasets (via, e.g., transforming one or more portions thereof, handle one or more missing values within the datasets, etc.), setting one or more target variables, and setting one or more dependent variables. A fourth step includes splitting the datasets for purposes of training and testing (for example, splitting the datasets with 70:30 ratio for training and testing). Such a step can include implementing a decision tree classifier with entropy criterion, and training the model(s) until improved accuracy is attained with different hyper-tuning parameters. Additionally, a fifth step includes predicting results, wherein accuracy can be verified via a confusion metric and/or an $F_1$ score.

It is to be appreciated that this particular pseudocode shows just one example implementation of a process for implementing a decision tree machine learning model with density distribution for predicting errors, and alternative implementations of the process can be used in other embodiments.

Figure 5:
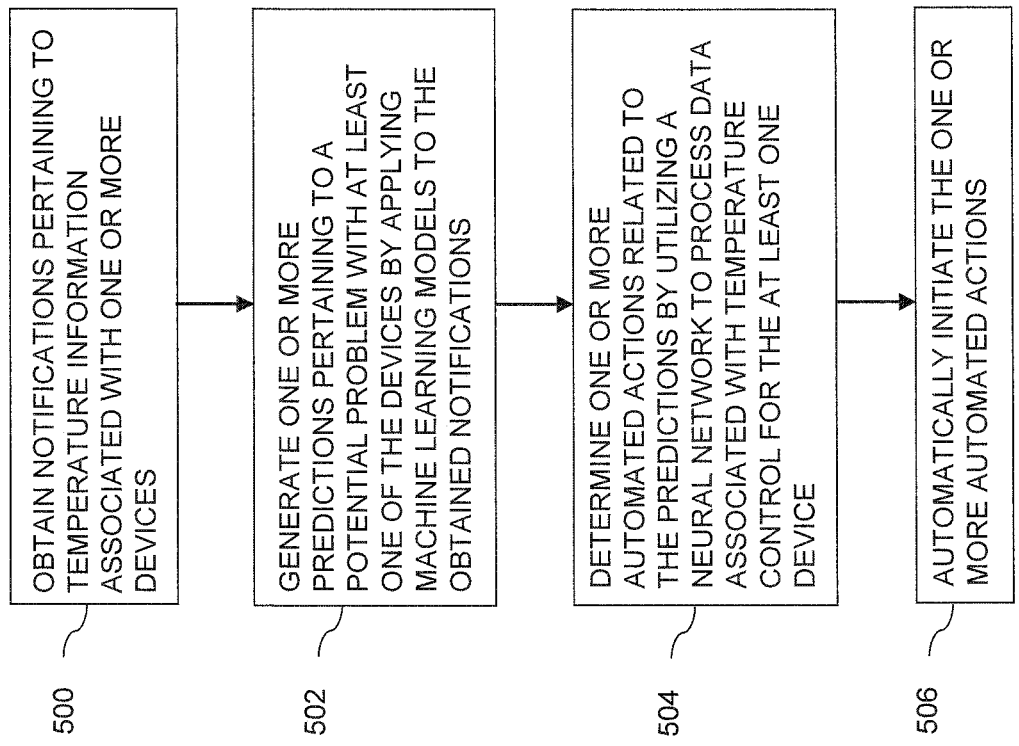
FIG. 5 is a flow diagram of a process for device temperature impact management using machine learning techniques in an illustrative embodiment.

FIG. 5 is a flow diagram of a process for device temperature impact management using machine learning techniques in an illustrative embodiment. It is to be understood that this particular process is only an example, and additional or alternative processes can be carried out in other embodiments.

In the example embodiment depicted in FIG. 5, the process includes steps 500 through 506. These steps are assumed to be performed by the device management server 105 utilizing its modules 130, 132 and 134.

Step 500 includes obtaining one or more notifications pertaining to temperature information associated with one or more devices. In at least one embodiment, the one or more notifications include one or more warning alerts related to the temperature information associated with the one or more devices. Such an embodiment can also include filtering the one or more warning alerts from a set of multiple notifications pertaining to temperature information associated with the one or more devices.

Step 502 includes generating one or more predictions pertaining to at least one potential problem with at least one of the one or more devices by applying one or more machine learning models to the one or more obtained notifications. In at least one embodiment, the one or more machine learning models include one or more decision tree models. Such an embodiment also includes utilizing at least one density distribution technique. Additionally, the one or more predictions can include at least one temporal element related to onset of the at least one potential problem.

Step 504 includes determining one or more automated actions related to the one or more predictions by utilizing at least one neural network to process data associated with temperature control for the at least one device. In at least one embodiment, the one or more automated actions include activating one or more fans associated with the at least one device and/or increasing intensity of one or more fans associated with the at least one device.

Step 506 includes automatically initiating the one or more automated actions. In at least one embodiment, automatically initiating the one or more automated actions includes automatically transmitting identifying information pertaining to the one or more automated actions to the at least one device.

In one or more embodiments, the techniques depicted in FIG. 5 can additionally include generating one or more temperature scales, on a per-device basis, for the one or more devices, wherein each of the temperature scales identifies at least a range of temperatures indicative of a problematic state and a range of temperatures indicative of a non-problematic state. In such an embodiment, the one or more predictions include one or more predictions of which of the one or more notifications detailing temperature information associated with the non-problematic state will transition to the problematic state in the future. Further, such an embodiment can additionally include updating the one or more temperature scales based at least in part on obtaining one or more additional notifications pertaining to temperature information associated with the one or more devices.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement decision tree error prediction and density distribution machine learning techniques to identify potential problems based at least in part on informative warning alerts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In one or more embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, as noted herein, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
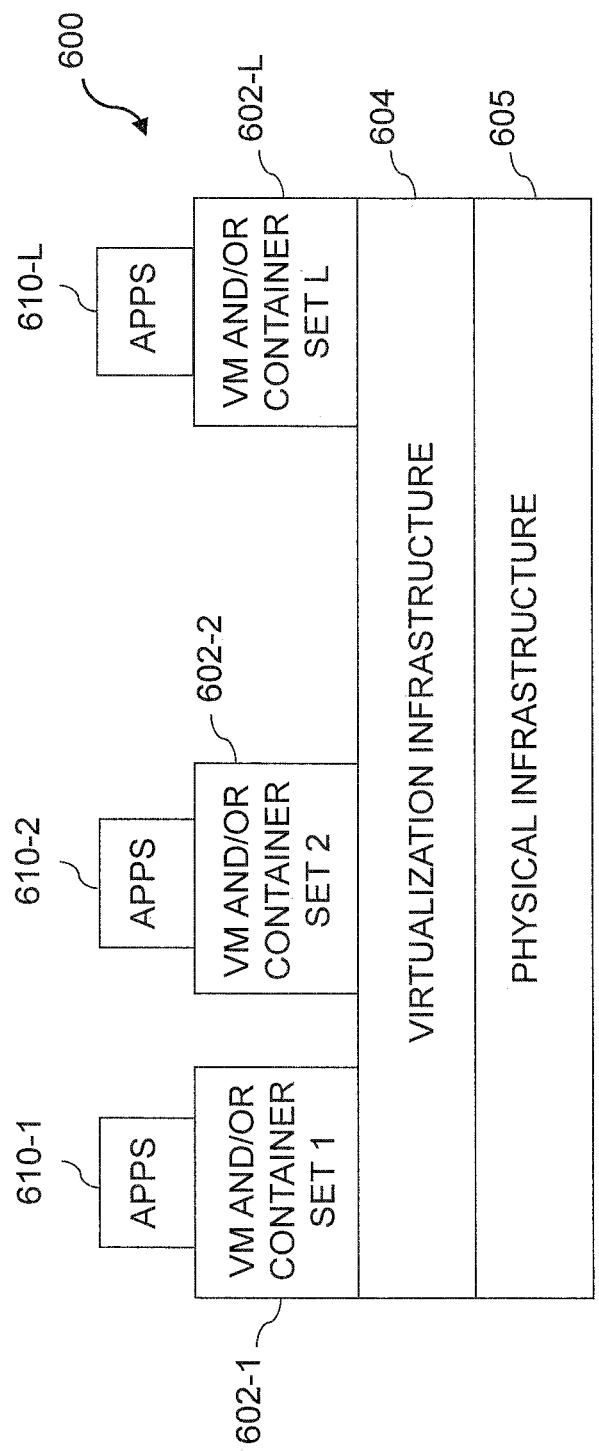
FIGS. 6 and 7 show examples of processing platforms that may be utilized to implement at least a portion of an information processing system in illustrative embodiments.
Figure 7:
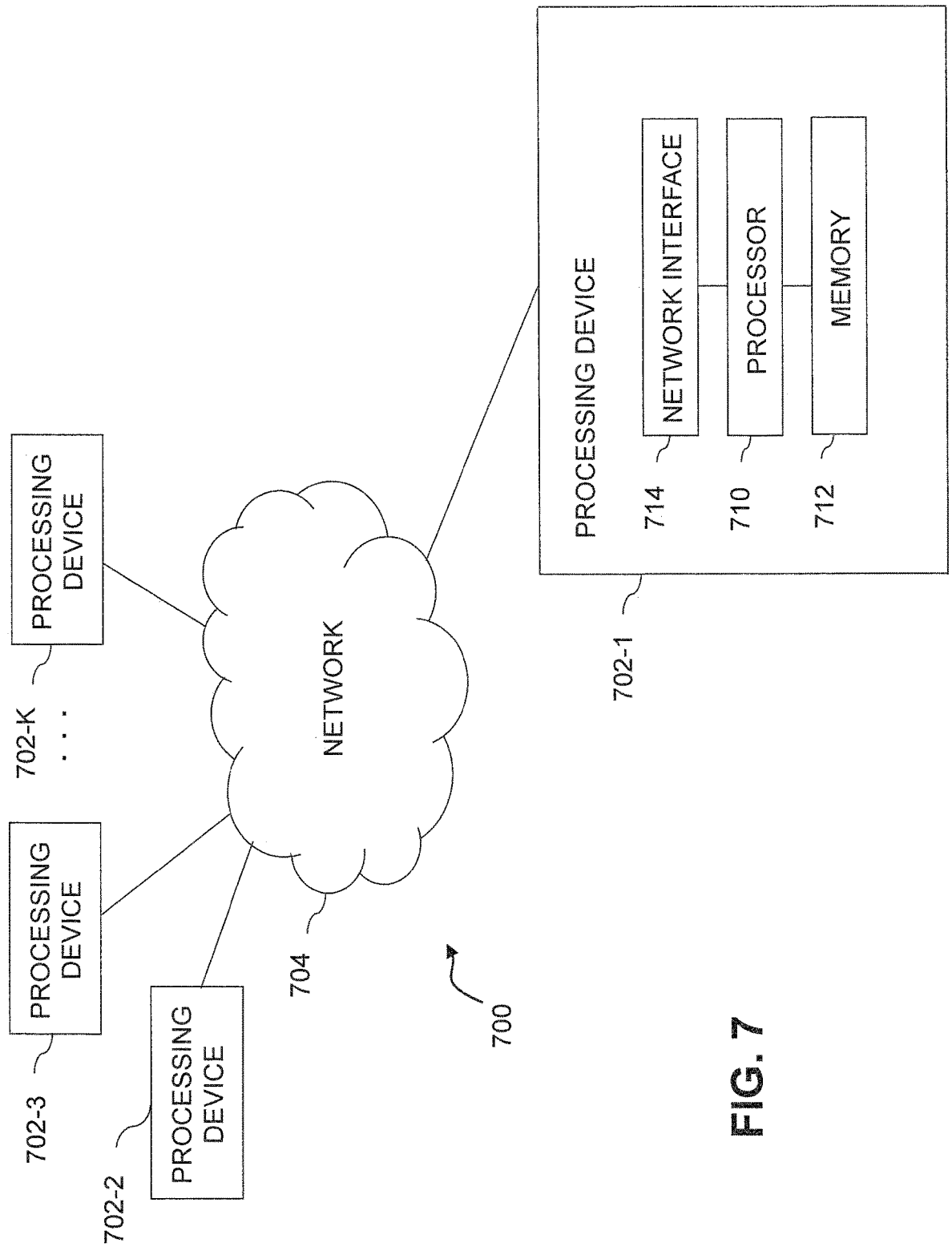

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) and/or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way merely of example only, and system 100 may include additional or alternative processing platforms, as well as numerous distinct processing platforms in any combination, with each such platform comprising one or more computers, servers, storage devices and/or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these storage products as well as other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, by way merely of example, the particular types of devices, databases, networks, and servers in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining one or more notifications pertaining to temperature information associated with one or more devices, wherein the one or more notifications comprise one or more warning alerts related to the temperature information associated with the one or more devices, and wherein obtaining comprises filtering the one or more warning alerts from a set of multiple notifications pertaining to temperature information associated with the one or more devices;
   generating one or more predictions pertaining to at least one potential problem with at least one of the one or more devices by applying one or more machine learning models to the one or more obtained notifications;
   determining one or more automated actions related to the one or more predictions by utilizing at least one neural network to process data associated with temperature control for the at least one device; and
   automatically initiating the one or more automated actions;
   wherein the method is performed by at least one processing device comprising a processor coupled to a memory.

2. The computer-implemented method of claim 1, wherein the one or more machine learning models comprise one or more decision tree models.

3. The computer-implemented method of claim 2, wherein the one or more machine learning models further comprise at least one density distribution technique.

4. The computer-implemented method of claim 1, wherein the one or more predictions comprise at least one temporal element related to onset of the at least one potential problem.

5. The computer-implemented method of claim 1, wherein automatically initiating the one or more automated actions comprises automatically transmitting identifying information pertaining to the one or more automated actions to the at least one device.

6. The computer-implemented method of claim 1, wherein the one or more automated actions comprises activating one or more fans associated with the at least one device.

7. The computer-implemented method of claim 1, wherein the one or more automated actions comprises increasing intensity of one or more fans associated with the at least one device.

8. The computer-implemented method of claim 1, further comprising:
   generating one or more temperature scales, on a per-device basis, for the one or more devices, wherein each of the temperature scales identifies at least a range of temperatures indicative of a problematic state and a range of temperatures indicative of a non-problematic state.

9. The computer-implemented method of claim 8, wherein the one or more predictions comprise one or more predictions of which of the one or more notifications detailing temperature information associated with the non-problematic state will transition to the problematic state in the future.

10. The computer-implemented method of claim 8, further comprising:
    updating the one or more temperature scales based on obtaining one or more additional notifications pertaining to temperature information associated with the one or more devices.

11. A non-transitory processor-readable storage medium having stored therein program code of one or more software programs, wherein the program code when executed by at least one processing device causes the at least one processing device:
    to obtain one or more notifications pertaining to temperature information associated with one or more devices, wherein the one or more notifications comprise one or more warning alerts related to the temperature information associated with the one or more devices, and wherein obtaining comprises filtering the one or more warning alerts from a set of multiple notifications pertaining to temperature information associated with the one or more devices;
    to generate one or more predictions pertaining to at least one potential problem with at least one of the one or more devices by applying one or more machine learning models to the one or more obtained notifications;
    to determine one or more automated actions related to the one or more predictions by utilizing at least one neural network to process data associated with temperature control for the at least one device; and
    to automatically initiate the one or more automated actions.

12. The non-transitory processor-readable storage medium of claim 11, wherein the one or more machine learning models comprise one or more decision tree models.

13. The non-transitory processor-readable storage medium of claim 12, wherein the one or more machine learning models further comprise at least one density distribution technique.

14. The non-transitory processor-readable storage medium of claim 11, wherein the one or more predictions comprise at least one temporal element related to onset of the at least one potential problem.

15. The non-transitory processor-readable storage medium of claim 11, wherein automatically initiating the one or more automated actions comprises automatically transmitting identifying information pertaining to the one or more automated actions to the at least one device.

16. An apparatus comprising:
    at least one processing device comprising a processor coupled to a memory;
    the at least one processing device being configured:
    to obtain one or more notifications pertaining to temperature information associated with one or more devices, wherein the one or more notifications comprise one or more warning alerts related to the temperature information associated with the one or more devices, and wherein obtaining comprises filtering the one or more warning alerts from a set of multiple notifications pertaining to temperature information associated with the one or more devices;

to generate one or more predictions pertaining to at least one potential problem with at least one of the one or more devices by applying one or more machine learning models to the one or more obtained notifications;

to determine one or more automated actions related to the one or more predictions by utilizing at least one neural network to process data associated with temperature control for the at least one device; and to automatically initiate the one or more automated actions.

17. The apparatus of claim 16, wherein the one or more machine learning models comprise one or more decision tree models.

18. The apparatus of claim 17, wherein the one or more machine learning models further comprise at least one density distribution technique.

19. The apparatus of claim 16, wherein the one or more predictions comprise at least one temporal element related to onset of the at least one potential problem.

20. The apparatus of claim 16, wherein automatically initiating the one or more automated actions comprises automatically transmitting identifying information pertaining to the one or more automated actions to the at least one device.

* * * * *